Patented Dec. 11, 1951

2,578,605

UNITED STATES PATENT OFFICE 2,578,605

SURFACE-TREATED SILICA

Daniel S. Sears, Cuyahoga Falls, and Edwin B. Newton, Akron, Ohio, assignors to The B. F. Goodrich Company, New York, N. Y., a corporation of New York No Drawing. Application November 1, 1947, Serial No. 783,628

9 Claims. (Cl. 260—766)

This invention relates to surface-treated silicon dioxide for use in rubber compounding and is particularly concerned with finely-divided silicon dioxide which is the solid product of combustion of silicon-bearing material, the silicon combustion product having basic material disposed on the surface thereof whereby the treated silica is adapted for use in combination with a rubber in a vulcanizable composition.

Silica prepared by the combustion of silicon-bearing material is particularly suitable for use as a reinforcing material in rubber compositions as disclosed in our copending application Serial No. 667,785, filed May 7, 1946, and now abandoned. Such combustion silica gives optimum reinforcement to rubber only when there is present in the composition basic material in an amount at least substantially equivalent to the acidic equivalent of the combustion silica.

Silica prepared in other ways than by the combustion of silicon-bearing material has little or no reinforcing effect on rubber regardless of the acidic or basic condition of the composition. Combustion silica has true reinforcing properties only under the proper condition of basicity during vulcanization of a composition including combustion silica. It is, therefore, an object of this invention to provide a composition of matter suitable for incorporation into conventional vulcanizable rubber compositions to obtain maximum reinforcement of the rubber composition upon vulcanization. Other objects will be apparent from the description which follows.

A composition of matter embodying this invention comprises finely-divided silicon dioxide which is the solid product of combustion of silicon-bearing material, together with basic material adsorbed on the surface of the particles of the silica in an amount sufficient at least to substantially offset the normal surface acidity of the silica prepared in this manner.

Silicon dioxide which is the finely divided solid combustion product of silicon-bearing material, referred to hereinafter as combustion silica for purposes of brevity, exhibits an anomalous character. For example, the product prepared by burning silicon-bearing material in the presence of oxygen consists substantially of pure silicon dioxide and has a marked degree of surface acidity which is not due to free acid adsorbed on the surface. This acidity appears to be due to groups of acid character on the surface, the nature of such acidic groups, if such they are, not being understood. The material normally exhibits surface acidity, but the surface acid cannot be leached away with water indicating that the acid components are integrally bound in the particle surface.

Unlike channel black, which also exhibits an acidic character, untreated combustion silica cannot be successfully employed in conventional rubber compounding recipes; but, as disclosed in our copending application, basic materials must be present during vulcanization. A composition of matter embodying this invention, however, may be incorporated directly into a vulcanizable composition comprising a vulcanizable rubber and vulcanizing agent therefor, and the resulting composition subjected to vulcanization in the usual manner.

The combustion silica which is used in practising this invention is the amorphous material having a particle size of 5–200 millimicrons prepared by the combustion of a silicon-bearing material, and preferably the product of combustion in the presence of sufficient oxygen to yield substantially pure silicon dioxide, although the combustion may be in an atmosphere of nitrogen to form a nitride and the combustion silica may include any amorphous solid combustion product of silicon-bearing material. It may be prepared by combustion of any of the normally solid, liquid, or gaseous silicon-bearing materials. For example, normally solid materials such as silicon metal, ferrosilicon, silicon nitride, silicon monosulfide, silicon tetra-acetate, silicon disulfide, etc., may be vaporized in a furnace or electric arc and rapidly oxidized to a finely-divided silica smoke. Alternatively, such solid materials may be powdered and sprayed into an oxygen-gas flame, whereupon the particles ignite and form the desired silica. A particularly suitable method of preparing combustion silica from solid materials such as sand, ferrosilicon, etc., is to mix the silicon-bearing material with ground coal or similar powdered carbon fuels and burn the mixture in a furnace in the presence of sufficient air to convert all of the silicon to finely-divided silicon dioxide.

In the case of readily volatilized material, such as the liquid silicon compounds, or in the case of normally gaseous silicon compounds, the combustion silica may be prepared by the method taught by McNabb in U. S. Patent No. 2,399,687 wherein the material is vaporized and the vapors are burned, either with or without being admixed with a combustible gas. Among the silicon-bearing materials which may be burned in this manner are such materials as ethyl silicate, silicon tetrachloride, silicon hydride, trisilicane amine, bromo silicane, dibromo silicane, dichloro silicane, silicane ether, tribromo silicane, trichloro silicane, trifluoro silicane, triiodo silicane, silicon tetrabromide, silicon bromo trichloride, silicon dibromo dichloride, silicon tribromo chloride, chlorosilicane, silicon chloro hydrosulfide, silicon tetrafluoride, disilicane, trisilicane, tetrasilicane, silicon iodo trichloride, silicon oxychloride, disiloxane, dimethyl silicane, ethoxy triethyl silicane, methyl silicane, tetraethyl silicane, tetramethyl silicane, trichlorophenyl silicane, triethyl silicane, chloromethyl silicane, dichloromethyl silicane and similar materials. Thus, any silicon dioxide which is the finely-divided amorphous product of combustion of a silicon-bearing material may be used within the scope of this invention, all such materials normally exhibiting the surface acidity characteristic of combustion silica.

Any basic material may be adsorbed on the surface of the combustion silica in preparing a composition of matter embodying this invention. Thus, the silica may be surface treated with any free base, whether an inorganic base such as sodium, potassium, or ammonium hydroxide or an organic base such as an amine. Of the organic bases, the substituted amines such as triethanolamine or the quaternary ammonium bases such as tetramethyl ammonium hydroxide may be used. The amines preferably employed, however, are those in which the amine is joined to a hydrocarbon structure; including any of the primary, secondary, or tertiary amino groups joined to either saturated or unsaturated aliphatic hydrocarbon structures or to an aromatic structure or both. Thus, for example, suitable amines include diallyl amine, diamyl amine, dibenzyl amine, dibutyl amine, dicyclohexyl amine, ethyl amine, diethyl amine, ethylene diamine, tertiary butyl amine, alpha-phenyl ethyl amine, phenethyl amine, methyl amine, hexamethylene tetramine, diphenyl guanidine, diorthotolyl guanidine, triphenyl amine, tripropyl amine, trimethylene diamine, isohexyl amine, secondary butyl amine, aniline, diphenyl amine, alpha-naphthyl amine, beta-naphthyl amine, phenyl beta-naphthyl amine and similar well known amines.

Particularly desirable amines for use in practising this invention are the long-chain aliphatic amines, i. e., those having at least 8 carbon atoms in the aliphatic chain, such amines aiding materially in dispersing silica coated with the amine in rubber. Such amines are typified by dodecylamine, dilaurylamine, octylamine, hendecylamine, dioctadecylamine and similar aliphatic amines.

The amount of basic material to be used in combination with a given weight of combustion silica must be sufficient to offset the apparent acidity of the silica, with excess basic material preferably being present. For practical purposes, the amount of basic material employed in the composition is from 0.1 to 15 milliequivalents of base per mole of combustion silica with 1 to 5 milliequivalents of base per mole of combustion silica being preferably used. In the case of a normally acid vulcanizable composition, an excess of basic material in the silicon material over the amount required to neutralize the acidity of the silicon material serves to react with the free acid in the composition to facilitate vulcanization; and, in such a case, the composition of matter may include the maximum amount of base which can be adsorbed by the combustion silica, that is, about 25 milliequivalents of base per mole of combustion silica.

The combustion silica may be surface treated with the basic materials in any desired manner. In the case of readily volatilized bases, such as ethylene diamine, the silica may be contacted with vapors of the base to attain the desired adsorption. Alternatively, the base may be dissolved in a suitable volatile solvent and the silica treated with the solution, after which the volatile solvent is removed by evaporation. Normally liquid bases may be sprayed on the silica as a fine mist. Any of the common and well known expedients for surface-treating solid particulate materials may be employed in addition to the methods enumerated.

A few typical examples of the combustion silica-base compositions will be set forth for purposes of illustration as well as a few typical examples of vulcanizable composition including surface-treated silica. It will be understood that the examples are merely illustrative and it is not intended that the scope of the invention be limited thereby.

Example 1

Ethyl silicate is vaporized and the vapors thereof admixed with illuminating gas, the gaseous mixture is ignited in air and the finely-divided combustion silica is collected. This combustion silica is spread in a thin layer and the vapors of ethylene diamine are passed over the silica for 30 minutes. The composition obtained is as follows:

| Material: | Parts by weight |
|---|---|
| Combustion silica | 100.0 |
| Adsorbed ethylene diamine | 0.4 |
| Total | 100.4 |

Example 2

Fine sand and ground coal are admixed and vaporized in an electric furnace and the vapors are burned in an oxidizing atmosphere to form combustion silica. This material is sprayed with dodecylamine which has been liquefied by heating to 35° C. The following composition is suitable for rubber compounding:

| Material: | Parts by weight |
|---|---|
| Combustion silica | 100.0 |
| Adsorbed dodecylamine | 1.0 |
| Total | 101.0 |

Example 3

Combustion silica which contains adsorbed basic material may be used in combination with a vulcanizable composition including any vulcanizable rubber, that is, any rubber whether natural or synthetic which may be heated with sulfur, sulfides or oxides to impart increased elasticity, hardness, etc., thereto.

Thus, a conventional compounding recipe using natural rubber is as follows:

| Material: | Parts by weight |
|---|---|
| Natural rubber | 96.0 |
| Zinc oxide | 5.0 |
| Pine tar | 5.0 |
| Sulfur | 3.5 |
| 2-Mercaptobenzothiazole | 1.0 |
| Reinforcing material | 48.0 |
| Total | 158.5 |

Such a composition may be readily vulcanized by heating at 280° F. for 40 minutes using conventional reinforcing material such as carbon black. By means of this invention, surface-treated combustion silica may be used as the reinforcing material in this recipe without any change therein. The combustion silica obtained by burning ferrosilicon is treated with dilaurylamine (5 milliequivalents of base per mole of silica), the resulting composition employed as the reinforcing material in the foregoing vulcanizable composition and the resulting composition vulcanized. The vulcanizate has a tensile strength above 4000 p. s. i. and crescent tear resistance above 60 lbs. per 0.1 inch.

Example 4

In some cases, it may be desirable to adsorb a basic vulcanization accelerator on the combustion silica. A typical example of combustion silica treated with a solution of diphenyl guanidine in alcohol and used in conjunction with a diene polymer is as follows:

| Material: | Parts by weight |
|---|---|
| Butadiene-styrene copolymer (75:25 copolymer by weight) | 100.0 |
| Zinc oxide | 2.0 |
| Pine tar resin | 8.0 |
| Sulfur | 3.0 |
| Treated combustion silica (silica 40 parts; diphenyl guanidine 2.5 parts) | 42.5 |
| Total | 155.5 |

This composition is vulcanized by heating at 280° F. for 20 minutes. The vulcanizate has a tensile strength of at least 2800 p. s. i. and a tear resistance of 30 lbs. per 0.1 inch as compared to a tensile strength below 1500 p. s. i. and tear resistance below 20 lbs. per 0.1 inch for a composition containing silica prepared by precipitation from solution.

Example 5

Similarly, combustion silica prepared by burning finely powdered silicon may be treated with a mixture of triethanolamine and triethyl trimethylene triamine by mixing the components in a ball mill. The resulting composition may be used in combination with a butadiene-styrene copolymer as follows:

| Material: | Parts by weight |
|---|---|
| Butadiene-styrene copolymer (60:40 copolymer) | 100.0 |
| Zinc oxide | 5.0 |
| Stearic acid | 7.0 |
| Sulfur | 3.0 |
| Treated silica (combustion silica 45.0 parts; triethanolamine 3.0 parts; triamine 1.0 part) | 49.0 |
| Total | 164.0 |

Vulcanization is carried out at 260° F. for 30 minutes. The resulting composition has a tensile strength in excess of 3000 p. s. i. and a crescent tear resistance of 30 lbs. per 0.1 inch.

The invention has been described in considerable detail with reference to a few preferred embodiments thereof but it will be understood that variations and modifications may be effected within the spirit and scope of the invention as defined in the appended claims.

We claim:

1. A composition of matter consisting essentially of finely-divided silicon dioxide which is the solid product of combustion of a silicon-bearing material, which silicon dioxide is normally characterized by surface acidity, and an amine disposed on the surface of said silicon dioxide in an amount at least sufficient to substantially neutralize said surface acidity.

2. A composition of matter consisting essentially of silicon dioxide of an average particle diameter of 5-200 millimicrons which is the solid product of rapid oxidation of a silicon-bearing material, and an amine adsorbed on the surface of said silicon dioxide in an amount at least sufficient to substantially offset the normally acid character of the surface of said silicon dioxide, which amine contains only carbon, hydrogen, and amino nitrogen atoms.

3. A composition of matter consisting essentially of finely-divided silicon dioxide which is the solid product of burning a normally solid silicon-bearing material, and an aliphatic amine having from 8 to 36 carbon atoms adsorbed on the surface of said silicon dioxide in an amount at least sufficient to substantially neutralize the normally acid character of the surface of said dioxide.

4. A composition of matter consisting essentially of particulate silicon dioxide having an average particle diameter of 5-200 millimicrons which is the solid product of combustion of a silicon-bearing material, said silicon dioxide having an aliphatic amine adsorbed on its surface in the proportion of 0.1 to 15 milliequivalents of base per mole of silicon dioxide, which amine contains from 8 to 36 carbon atoms.

5. A composition of matter consisting essentially of finely-divided silicon dioxide which is the solid product of combustion of a silicon-bearing material, and dodecylamine adsorbed on the surface of said silicon dioxide in an amount at least sufficient to substantially neutralize the normally acid character of the surface of said dioxide.

6. Finely-divided amorphous silicon dioxide having an average particle diameter of 5-200 millimicrons, said silicon dioxide being the solid product of combustion of silicon-bearing vapors, said silicon dioxide having adsorbed on the surface thereof dodecylamine in an amount at least sufficient to substantially neutralize the normal surface acidity of said silicon dioxide.

7. A vulcanizable composition of matter comprising a vulcanizable rubber and vulcanizing agent therefor, and a finely-divided silicon dioxide which is the solid product of combustion of silicon-bearing material, said silicon dioxide having an amine adsorbed on the surface thereof in an amount at least sufficient to substantially offset the normal surface acidity of said silicon dioxide, said silicon dioxide being dispersed in said rubber and amounting to about 40 to 50% by weight of said rubber.

8. A vulcanizable composition of matter comprising a vulcanizable rubber and vulcanizing agent therefor, and amorphous silicon dioxide having a particle size of 5-200 millimicrons which is the solid product of combustion of silicon-bearing vapors, said silicon dioxide being normally characterized by surface acidity and having adsorbed on the surface thereof in an amount at least sufficient to neutralize the acid at the surface of the silicon dioxide particles an aliphatic amine containing from 8 to 36 carbon atoms, said silicon dioxide being dispersed in said rubber and amounting to about 40 to 50% by weight of said rubber.

9. The method of making a reinforcing pigment suitable for use in a vulcanizable rubber composition which comprises adsorbing on the surface of a finely-divided silicon dioxide which is the solid product of combustion of a silicon-bearing material an aliphatic amine containing from 8 to 36 carbon atoms, said silicon dioxide being normally characterized by surface acidity, the amount of said basic material being at least sufficient to substantially neutralize said surface acidity.

DANIEL S. SEARS.
EDWIN B. NEWTON.

REFERENCES CITED

The following references are of record in the file of this patent:

UNITED STATES PATENTS

| Number | Name | Date |
|---|---|---|
| 1,730,485 | Teague | Oct. 8, 1929 |
| 1,843,576 | McClure et al. | Feb. 2, 1932 |
| 2,103,461 | Hock et al. | Dec. 28, 1937 |
| 2,282,006 | Sloan | May 5, 1942 |
| 2,348,072 | Kanhofer | May 2, 1944 |
| 2,428,252 | Von Strob | Sept. 30, 1947 |